(No Model.)

H. F. RISCH.
FENDER ATTACHMENT FOR TROLLEY CARS.

No. 549,256. Patented Nov. 5, 1895.

WITNESSES:
Juan Carlos Abel
K. R. Brennan

INVENTOR
Henry F. Risch
BY
Gorpus Gaegener
ATTORNEYS.

UNITED STATES PATENT OFFICE.

HENRY F. RISCH, OF BROOKLYN, NEW YORK.

FENDER ATTACHMENT FOR TROLLEY-CARS.

SPECIFICATION forming part of Letters Patent No. 549,256, dated November 5, 1895.

Application filed August 4, 1894. Serial No. 519,436. (No model.)

*To all whom it may concern:*

Be it known that I, HENRY F. RISCH, a citizen of the United States, residing in the city of Brooklyn, in the county of Kings and State of New York, have invented certain new and useful Improvements in Fender Attachments for Trolley-Cars, of which the following is a specification.

This invention has reference to an improved fender for trolley, cable, and other surface cars, which, when placed in position for use, scoops up any obstruction on the track, so as to prevent accidents to body and limb, and which can be moved up against the dashboard when not required for use; and the invention consists of a fender attachment for trolley, cable, or other cars, which comprises a main scoop-fender net that is pivoted to the forward-extending frame of the car extended in front of the platform, an auxiliary fender-net connected to the arms of the main fender-net and to separate arms pivoted to the supporting-frame of the car, and lever connections between the arms of the main fender and the auxiliary fender by which the auxiliary fender is adapted to follow the motion of the main fender, as will be fully described hereinafter, and finally pointed out in the claims.

Figure 1:
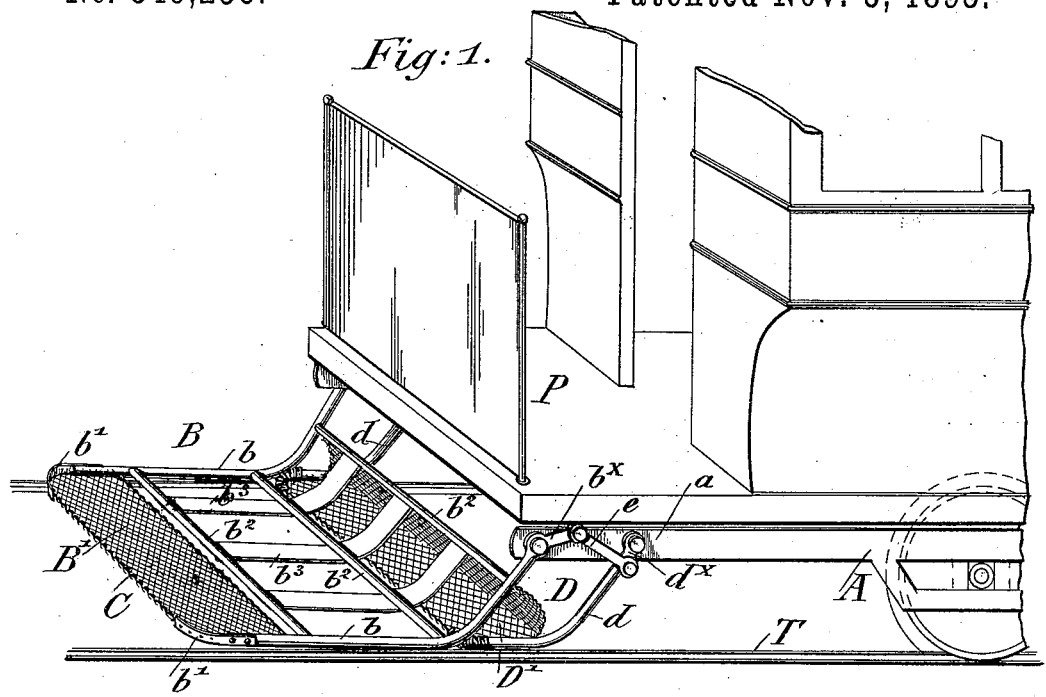
Figure 2:
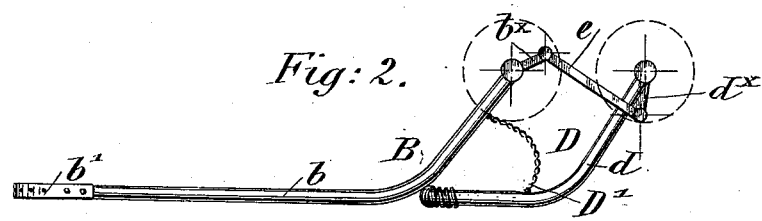
Figure 3:
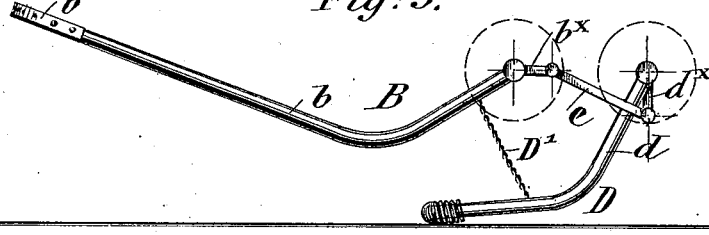
Figures 4, 5:
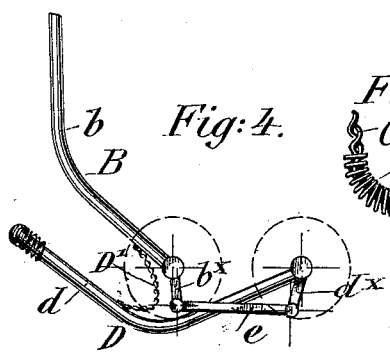

In the accompanying drawings, Figure 1 represents a perspective view of a street-car with my improved fender attachment; and Figs. 2, 3, and 4 are side elevations showing the different positions of the main and auxiliary fenders, respectively, in normal position in front of the car, in an intermediate position for scooping up small obstructions, and in raised position when not required for use. Fig. 5 is a view showing a modified form of corner piece.

Similar letters of reference indicate corresponding parts.

Referring to the drawings, A represents the supporting frame or truck of a trolley, cable, or other surface car, which supporting-frame is provided with forward-extending arms $a$, that extend below the platform P of the car. To the forward-extending arms $a$ are pivoted the curved arms $b\ b$ of the main scoop-fender B, and likewise at some distance back from the arms $b\ b$ the curved arms $d$ of an auxiliary fender D, which is located below the main fender B.

The arms $b$ of the main fender B extend in inclined position from the arms $a$ in downward and forward direction toward the track T, being then curved and extended straight, parallel with the track, they being provided at their outer ends with inwardly-curved steel corner-pieces $b'$, to which is attached a transverse connecting-chain C or a rubber cord or any suitable connecting device.

The arms $b$ of the main fender B are stiffened by transverse rods $b^2$, which are connected by means of thin sheet-metal strips $b^3$, which form thereby a kind of scoop.

A fender-net B' is stretched between the inwardly-bent steel corner pieces and the front ends of the arms $b$, in front of the outermost transverse rod $b^2$, said net having a certain degree of elasticity, so as not to injure a body coming in contact with it, the fender lowering by the weight of the body and scooping the same up, so as to prevent injury thereto.

In place of the steel corner-pieces $b'$ at the end of the fender B', strong spiral springs S may be attached to the ends of the arms $b$, as shown in Fig. 5, which springs are attached to the front ends of the curved arms $b$ and then bent inwardly and connected to the transverse chain or other elastic connection C.

The auxiliary fender-net D' is attached to the curved arms $d$, and also to the rearmost transverse rod $b^2$ of the main fender B, said auxiliary net forming thus a kind of bight or pocket by which the smaller obstructions that are not taken up by the main fender are scooped up, so that they are prevented from being injured by the wheels of the car. The fender-net D' is attached to the curved arms $d$ in the same manner as the fender-net B' of the main fender, so that the same has a certain elasticity by which injury to the bodies scooped up is prevented.

The arms $b$ of the main fender B, as well as the arms $d$ of the auxiliary fender D, are provided with rigid crank-extensions $b^{\times}$ and $d^{\times}$, respectively, which are arranged at a certain angle to the arms, and the ends of which are connected by links $e$, so as to form a lever connection between the main and auxiliary fenders by which the relative position of the same toward each other in their different positions are determined.

When the fenders B D are lowered, the auxiliary fender abuts against the curved arms of the main fender, as shown in Fig. 2, but in case a small obstruction strikes the front end of the main fender, and instead of being scooped up on the same passes below and lifts it, the lever connection between the fenders moves the auxiliary fender in downward direction close to the rails, so as to scoop up positively the smallest obstruction that is placed on the track. The position of the main and auxiliary fenders is shown in Fig. 3. The auxiliary fender produces, therefore, the scooping of any small body, such as that of a child, which would not be scooped up by the main fender, so as to prevent injury and accident to the same.

When the fender is not required for use, the main fender is moved in upward direction, the auxiliary fender following, until both fenders are in the position shown in Fig. 4, which is the position of the fender at the rear end of the car, while the front fender is in lowered position, as shown in Fig. 1.

The main, as well as the auxiliary fender, is constructed in any approved manner, provided that a certain elasticity and flexibility is given to the same, so as to give sufficiently when striking obstructions and to scoop up bodies without injury thereto. The essential feature of my improved fender attachment is the coaction of the main and auxiliary fender-nets, which is produced by the lever mechanism which connects the arms of the fenders.

As the fender attachment is applied to the forward-extending arms of the supporting-frame of the car, it is independent of the body of the car and is supported thereby at a uniform distance from the track, so as not to come into contact with the track or pavement and interfere with the proper movement of the car.

Having thus described my invention, I claim as new and desire to secure by Letters Patent—

1. The combination, with a car, of a swinging main-fender projecting in front of the car at an incline and being approximately the width of the car, an auxiliary inner swinging fender, and rods on said main-fender adapted to engage the rear-end of said auxiliary fender, whereby said auxiliary fender is lowered when the main-fender is raised, and vice versa, substantially as and for the purposes set forth.

2. The combination, with the supporting-frame of a car, of a forwardly-projecting main scoop-fender pivoted to the frame and extending from side to side thereof, an auxiliary fender pivoted to said frame at some distance to the rear of the main scoop-fender, the forward portion of the auxiliary fender extending under the main scoop-fender, and a lever-connection between the main and auxiliary fenders, substantially as set forth.

3. The combination with the supporting-frame of a car, of a main fender, the arms of which are pivoted to said frame, a transverse-rod connecting said arms, an auxiliary fender, the arms of which are also pivoted to said frame at some distance back of the pivots of the main fender, a main fender-net attached to the front ends of the arms of the main fender, and an auxiliary fender-net attached to the front ends of the arms of the auxiliary fender and to the transverse rod connecting the arms of the main fender, substantially as set forth.

4. In a fender-attachment for cars, a fender provided with side-arms, elastic and inwardly-curved corner-pieces arranged at the side of said arms, and an elastic fender-net connecting the front ends of the inwardly curved corner-pieces, substantially as set forth.

5. The combination with a supporting-frame of a car, a main scoop fender pivoted to the frame and composed of arms, a fender-net stretched between the forward ends of the arms, transverse connecting-rods extending between the fender-arms, and longitudinal strips arranged under and connecting said transverse rods, of an auxiliary fender pivoted also to said frame at some distance to the rear of the main scoop-fender, and a lever-connection between the main and auxiliary fenders, substantially as set forth.

6. A fender attachment for cars, comprising a car-supporting-frame, a main fender pivoted to said frame, an auxiliary fender pivoted likewise to said frame at some distance from the main fender, the main and auxiliary fenders being provided with fender-nets, and said auxiliary fender being connected with the rear-part of the main fender, crank arms extending beyond the pivots of the main and auxiliary fenders, and pivot-rods connecting the crank-arms of the main and auxiliary fenders, so that the auxiliary fender is adapted to be set into different relative positions toward the main fender, as required for different conditions, substantially as set forth.

In testimony that I claim the foregoing as my invention I have signed my name in presence of two subscribing witnesses.

HENRY F. RISCH.

Witnesses:
PAUL GOEPEL,
K. R. BRENNAN.